United States Patent
Wong

(10) Patent No.: US 11,064,682 B2
(45) Date of Patent: Jul. 20, 2021

(54) LEASH AND HARNESS ASSEMBLIES

(71) Applicant: Chung Fai Wong, Bellevue, WA (US)

(72) Inventor: Chung Fai Wong, Bellevue, WA (US)

( * ) Notice: Subject to any disclaimer, the term of this patent is extended or adjusted under 35 U.S.C. 154(b) by 0 days.

(21) Appl. No.: 16/985,626

(22) Filed: Aug. 5, 2020

(65) Prior Publication Data
US 2021/0120785 A1    Apr. 29, 2021

Related U.S. Application Data

(60) Provisional application No. 62/925,588, filed on Oct. 24, 2019.

(51) Int. Cl.
*A01K 27/00* (2006.01)
*F16B 45/06* (2006.01)
*F16B 1/00* (2006.01)

(52) U.S. Cl.
CPC .......... *A01K 27/005* (2013.01); *A01K 27/002* (2013.01); *A01K 27/003* (2013.01); *F16B 1/00* (2013.01); *F16B 45/06* (2013.01); *F16B 2001/0035* (2013.01)

(58) Field of Classification Search
CPC .. A01K 27/005; A01K 27/003; A01K 27/002; Y10T 24/45293; Y10T 24/32; A44D 2203/00
See application file for complete search history.

(56) References Cited

U.S. PATENT DOCUMENTS

| | | | | |
|---|---|---|---|---|
| 3,589,341 | A * | 6/1971 | Krebs | A01K 27/005 119/865 |
| 4,019,463 | A * | 4/1977 | Kitchen | A01K 27/003 119/793 |
| 9,549,536 | B2 | 1/2017 | Soto | |
| 9,549,608 | B1 | 1/2017 | Emery | |
| 9,560,836 | B2 | 2/2017 | DeBien | |
| 9,936,772 | B2 * | 4/2018 | Paik | A45F 3/047 |
| 10,111,500 | B2 * | 10/2018 | Lambert | A44B 11/28 |
| 10,117,421 | B2 | 11/2018 | Durfee | |
| 2008/0047111 | A1 * | 2/2008 | Garber | A44C 5/2061 24/303 |
| 2010/0308605 | A1 * | 12/2010 | Fiedler | A45C 13/1084 292/251.5 |
| 2012/0255506 | A1 * | 10/2012 | Anthony | A01K 27/003 119/793 |
| 2013/0185901 | A1 | 7/2013 | Heyman et al. | |
| 2016/0003274 | A1 * | 1/2016 | Garlick | F16B 7/0413 403/325 |
| 2016/0244318 | A1 * | 8/2016 | Linner | B68B 5/00 |
| 2017/0202184 | A1 * | 7/2017 | Moore | A01K 27/003 |

(Continued)

*Primary Examiner* — Magdalena Topolski
*Assistant Examiner* — Katelyn T Truong
(74) *Attorney, Agent, or Firm* — Houda El-Jarrah; Bold IP, PLLC

(57) ABSTRACT

An assembly providing a leash component, a harness component and an attachment mechanism adapted to attach the leash to the harness is provided. The leash includes two or more handles positioned along its length that may be connected together to effectively reduce the leash's length. The attachment mechanism includes guiding magnets that may facilitate the proper alignment and orientation of the mechanism during engagement between the leash and the harness. In this way, the attachment mechanism is configured to be activated using one hand.

18 Claims, 19 Drawing Sheets

(56) References Cited

U.S. PATENT DOCUMENTS

2017/0241470 A1* 8/2017 Vaccari ............... A01K 27/005
2018/0192617 A1   7/2018 Jirsa et al.
2018/0199547 A1* 7/2018 Moore ................ A01K 27/005
2018/0368356 A1* 12/2018 Case .................. A01K 27/003

* cited by examiner

LEASH AND HARNESS ASSEMBLIES

CROSS-REFERENCE TO RELATED APPLICATIONS

This application claims priority to U.S. Provisional Application No. 62/925,588, filed Oct. 24, 2019, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to one or more leash and harness assemblies, including a leash with an adjustable length and a self-guiding attachment mechanism to attach the leash to the harness in one or more non-limiting embodiments.

BACKGROUND

According to the American Pet Products Association, over sixty-eight percent of U.S. households, or about eighty-five million families, own a pet. Many of these pets are dogs that require daily walks for exercise and overall good health.

When taking a dog for a walk outside, the dog is typically controlled using a leash attached to the dog's collar. In some circumstances, it may be allowable to use a longer leash (e.g., in less crowded, rural settings) while in other circumstances a shorter leash may be preferable (e.g., in more crowded, urban settings). In addition, when not in use, a longer leash may cumbersome to easily store, and so shortening the leash's length may be preferable for storage. However, many leashes do not allow for easy length adjustment.

In addition, the attachment mechanism (e.g., the clip) that attaches the leash to the collar must be strong and robust to ensure that the animal is properly restrained and safe. However, many of these attachment devices are difficult to align and require two-hands and excessive effort to connect and/or detach. In addition, attachment mechanisms with alignment mechanisms such as opposing magnets currently lack lateral (side-to-side) support and are thereby difficult to properly align. For example, U.S. Patent Publication No. 2013/0185901 discloses an attachment mechanism with alignment magnets that are each flush within opposing surfaces without lateral support and are thereby difficult to align properly during use.

Accordingly, there is a need for a leash that may be adjusted in length while in use and for easy storage. There is also a need for an easy-to-use self-aligning attachment mechanism to connect the leash to the dog's collar without excessive effort (e.g., using one hand).

SUMMARY

According to one aspect, one or more embodiments are provided below for a leash and harness attachment assembly. The leash and harness attachment assembly may include an attachment mechanism with a first portion adapted to be coupled to a leash and a second portion adapted to be coupled to a harness. The attachment mechanism's first portion may include a first hook member and a second hook member, with each hook member including a distal end and a proximal end. The respective proximal ends of the first and second hook members may be coupled together at a pivot point so that each member's distal end may transition from a first position to a second position about the pivot point. The attachment member's first portion also may include a first magnet attached adjacent the pivot point. The attachment member's second portion may include a ring with a central aperture, and a second magnet attached to a bottom portion of the ring adjacent the aperture. In use, when the first and second hook members are in the first position, the distal ends of the hook members are overlapping, and when the first and second hook members are in the second position, the distal ends of the hook members are separated. When the distal ends of the hook members are separated, the second position provides a path for the second magnet to engage with the first magnet. When the hook members overlap, the first position causes the distal ends of the first and second hook members to each pass through the aperture in the attachment member's second portion.

According to another aspect, the present description includes a leash and harness attachment assembly that may include a leash, a harness, and a first and second hook member configured with the leash. The first and second hook members may each include a proximal end configured with a pivot point and a distal end extending therefrom. The first and second hook members may be adapted to transition from a first position to a second position. The assembly also may include a first magnet configured with the leash adjacent the pivot point, and a first ring configured with the harness and defining a first aperture. The assembly also may include a second magnet configured with the first ring adjacent the first aperture. In use, when the first and second hook members are in the first position, the distal ends of the hook members are overlapping, and when the first and second hook members are in the second position, the distal ends of the hook members are separated. When the distal ends of the hook members are separated, the second position provides a path for the second magnet to engage with the first magnet and when the hook members are overlapping, the first position causes the distal ends of the first and second hook members to each pass through the first aperture of the first ring.

In any of the forgoing aspects, the leash and harness attachment assembly may include a first handle configured with the leash at a first location and a second handle configured with the leash at a second location distinct from the first location. The leash may include a proximal end and a distal end, and the first location may be towards the leash's proximal end and the second location may be towards the leash's distal end. The first handle may include a first handle attachment mechanism and the second handle may include a second handle attachment mechanism, with the first and second attachment mechanisms adapted to attach to one another. In some embodiments, the first and second attachment mechanisms may include first and second magnets, respectively. The first handle also may include a first guide mechanism and the second handle also may include a second guide mechanism, with the first and second guide mechanisms adapted to engage with one another.

Other aspects and advantages of the invention will be apparent from the following description and the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

Figure 1:
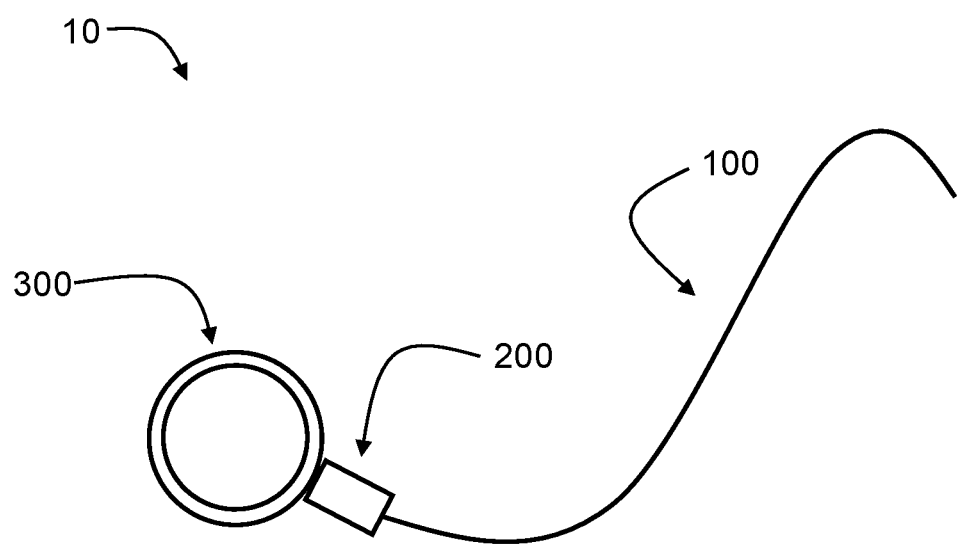
FIG. 1 is a pictorial illustration showing aspects of a leash and harness assembly according to exemplary embodiments hereof.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

In general, the leash and harness assembly according to exemplary embodiments hereof includes a leash (e.g., a pet leash) and an associated attachable harness (e.g., a pet collar, body harness, etc.). The assembly provides an easy-to-use and self-aligning attachment mechanism adapted to attach the leash to the harness. In some embodiments, the attachment mechanism includes a first portion configured with the leash and a corresponding second portion configured with the harness. In this way, the first and second portions may be engaged to attach the leash to the harness. As will be evident to a person of ordinary skill in the art, the current invention also may be applied to other products such as (without limitation) collar buckles, harness buckles, pet automobile seat belts, pet truck bed tether systems and other products. It is noted that the term "configured with" as used herein may be used interchangeably with "coupled with" or "attached to". The components may be configured or attached or coupled together either directly or indirectly in one or more non-limiting embodiments.

In some embodiments, the first and second portions of the attachment mechanism include guiding members (e.g., magnets) that are adapted to guide the first and second portions together (e.g., along a preferred axis and/or at a preferred orientation) during their engagement. As will be described in other sections, the architecture of the attachment mechanism and the corresponding guiding members may facilitate the attaching and subsequent detaching of the first and second portions using one hand (e.g., by aligning the guiding members and squeezing the attachment mechanism between the thumb and forefinger).

In some embodiments, the leash includes multiple handles positioned along its length that may be attached together (e.g., using magnets) to shorten or subsequently lengthen the leash. Advantageously, shortening the length of the leash during use may allow for better control of the restrained animal, while lengthening the leash may allow the restrained animal more freedom to enjoy. The leash may also be shortened for easy storage (e.g., to be hung on a wall hook).

The assembly may be used with a variety of animals, including (without limitation) pets such as dogs, cats, pigs and horses, non-pets such as zoo animals and livestock, as well as other types of animals. For the purposes of this specification, the assembly will be described in relation to its use with pets such as dogs. However, it is understood by a person of ordinary skill in the art, upon reading this specification, that the assembly may be used with any type of animal, and that the scope of the assembly is not limited in any way by the animal with which it may be used.

In one exemplary embodiment hereof, as shown in FIG. 1, the assembly 10 may include a leash assembly 100, an attachment mechanism 200 and a harness assembly 300. In general, the attachment mechanism 200 may attach the leash assembly 100 to the harness assembly 300. The assembly 10 may also include other components and elements as necessary for the assembly 10 to perform its functionalities.

The Leash Assembly

Figure 2:
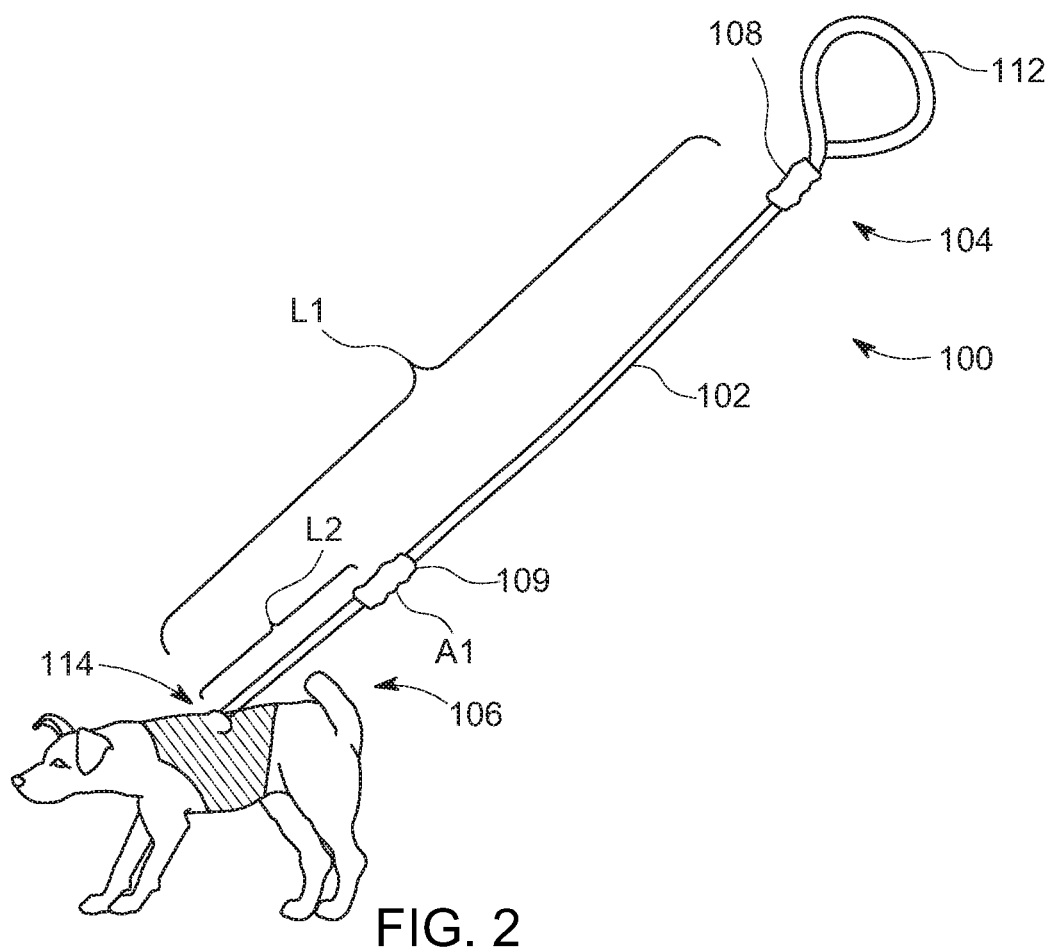
FIG. 2 is a pictorial illustration showing aspects of a leash assembly according to exemplary embodiments hereof.
Figure 3:
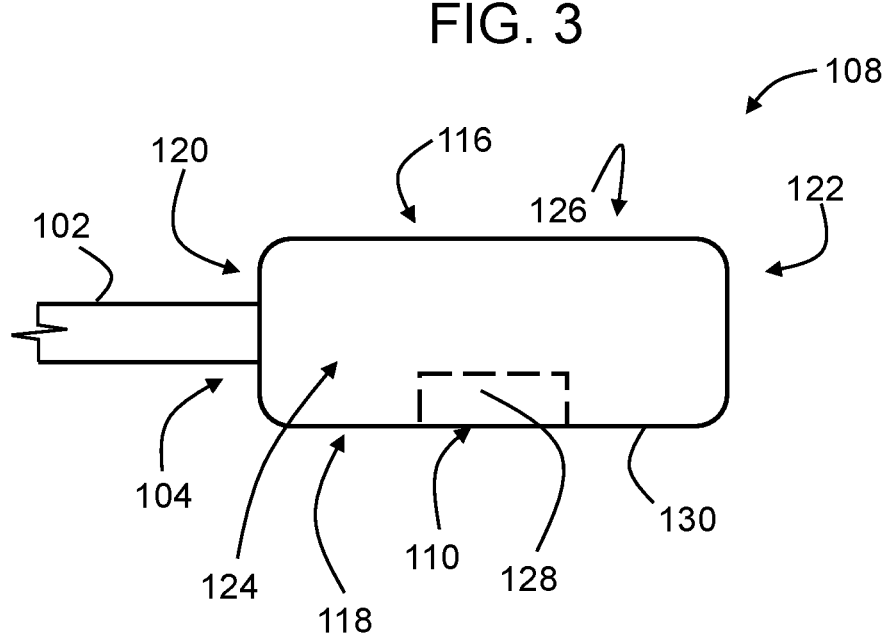
FIG. 3 is a pictorial illustration showing aspects of a first leash handle according to exemplary embodiments hereof.
Figure 4:
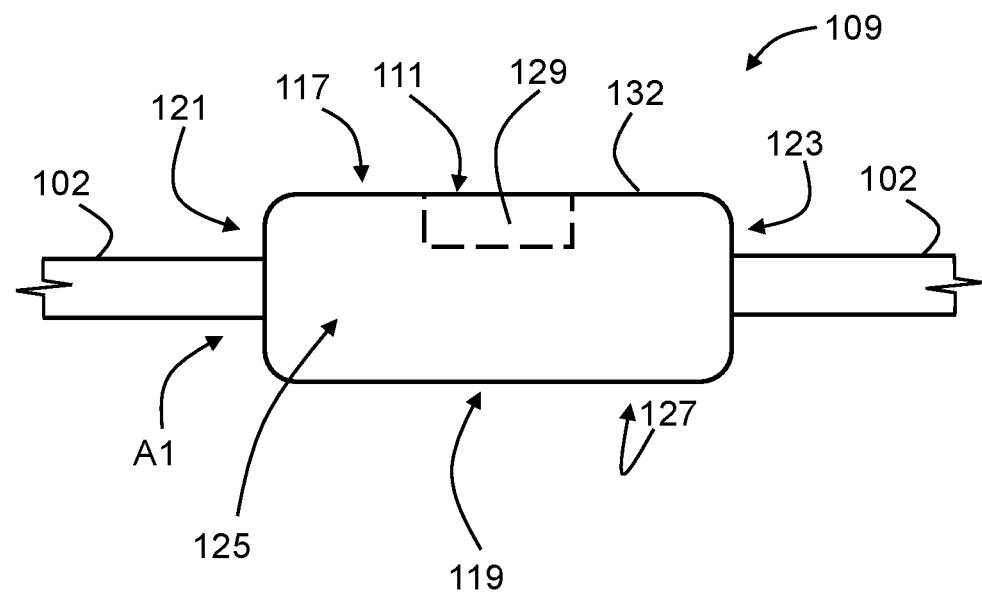
FIG. 4 is a pictorial illustration showing aspects of a second leash handle according to exemplary embodiments hereof.

In one exemplary embodiment hereof as shown in FIG. 2-FIG. 4, the leash assembly 100 includes a line 102 with a first end 104 (e.g., a proximal end) and a second end 106 (e.g., a distal end), a first handle 108, and a second handle 109. FIG. 3 further illustrates a first handle attachment member 110 as shown in FIG. 3 and a second handle attachment member 111 as shown in FIG. 4. Note that additional attachment members also may be used. The leash assembly 100 also may include a first end loop 112 and a second end mount 114 (e.g., first end loop 112 and end mount 114 as shown in FIG. 2). As shown in FIG. 2, the leash assembly 100 is connected via an attachment mechanism 200 to the harness assembly 300 that may be located on a pet (e.g., the dog shown in FIG. 2) or any other animal. The leash assembly 100 may be used to control the movements of the pet or other animal.

The line 102 may comprise a rope, cord, string, chain, cable, wire, other type of line and any combination thereof. It is preferable that the line 102 be flexible with an adequate tensile strength for its purposes. The line 102 may comprise natural fibers such as hemp, synthetic fibers such as polypropylene, metal, plastic, other types of materials and any combination thereof. The line 102 may be of any adequate length, such as 4-12 feet, and preferably about 6 feet long.

As shown in FIGS. 2 and 3, the first handle 108 may be coupled with the first end 104 of the line 102 and may generally encompass the circumference of the line 102 (or at least a portion thereof) at its point of attachment. The first handle 108 is preferably shaped and sized to fit comfortably within the palm of the user's hand to be grasped by the user's fingers and thumb. Accordingly, the first handle 108 may include a top portion 116, a bottom portion 118, a front portion 120, a back portion 122, a left side portion 124 and a right side portion 126 which are illustrated in FIG. 3 in an exemplary embodiment. The first handle 108 may terminate the first end 104 of the line 102 or may be configured such that a portion of the line's first end 104 may extend past the handle's back portion 122. In addition, the first end loop 112 may be configured with the handle's back portion 122 or with any portion of the first end 104 of the line 102 as suitable.

The cross-sectional shape of the handle 108 as shown in FIG. 2 and FIG. 3 may be circular, oval shaped, rectangular (e.g., with rounded edges), octagonal, other suitable cross-sectional shapes and any combination thereof. The first handle 108 may also include ergonomic forms that may align with the anatomy of the user's hand (e.g., finger grooves), textures to facilitate gripping, smooth surfaces for comfort and any combination thereof.

The first handle 108 may comprise any suitable material such as plastic, rubber, leather, other types of materials and any combination thereof. The first handle 108 may comprise a single unit that may be coupled with the line 102 during the manufacturing process (e.g., using overmolding or insert molding) or may comprise multiple pieces that may be assembled together in conjunction with the line 102 (e.g., using stitching, clamps, screws, latches, etc.). In any event, the first handle 102 is preferably securely attached to the first end 104 of the line 102 as shown in FIG. 2 such that the user may hold and control the leash assembly 100 by grasping the first handle 108.

In one exemplary embodiment hereof, the first handle attachment member 110 may be configured with the bottom portion 118 of the first handle 108. In one exemplary embodiment hereof, the first handle attachment member 110 may include a first handle magnet 128 as shown in FIG. 3. As shown in FIG. 3, the first handle magnet 128 may be embedded in the bottom portion 118 and generally flush with the bottom surface 130 as shown, may protrude slightly or wholly from the bottom surface 130, may be recessed in the bottom surface 130 or otherwise generally configured with the bottom portion 118 of the first handle 108 as required. The pole alignment of the first handle magnet 128 will be discussed below. The magnet 128 may be secured to the handle 108 using adhesive, pressure fit, overmolding, insert molding or other attachment techniques. It is also understood that the first handle magnet 128 may be configured with other portions of the first handle 108 (e.g., the top portion 116 or the left or right side portions 124, 126 as shown in FIG. 3) as necessary. As will be described in other sections, the first handle magnet 128 (which is figuratively shown in FIG. 3) may help facilitate the lengthening and shortening of the leash assembly 100.

As shown in FIGS. 2 and 4, the second handle 109 may be coupled with the line 102 at an intermediary location A1 (e.g., as shown in FIG. 4) along the line's length. The second handle 109 may include a top portion 117, a bottom portion 119, a front portion 121, a back portion 123, a left side portion 125 and a right side portion 127 as shown in FIG. 4. The aspects of the first handle 108 as described above (e.g., the shape, construction, etc.) may also pertain to the second handle 109.

In one exemplary embodiment hereof, the second handle attachment member 111 may be configured with the top portion 117 of the second handle 109. In one exemplary embodiment hereof, the second handle attachment member 111 may include a second handle magnet 129. The second handle magnet 129 may be embedded in the top portion 117 and generally flush with the top surface 132 as shown, may protrude slightly or wholly from the top surface 132, may be recessed in the top surface 132 or otherwise generally configured with the top portion 117 of the handle 109 as required. The pole alignment of the second handle magnet 129 will be discussed below. The magnet 129 may be secured to the handle 109 using adhesive, pressure fit, overmolding, insert molding or other attachment techniques. It is also understood that the second handle magnet 129 may be configured with other portions of the second handle 109 (e.g., the top portion 117 or the left or right side portions 125, 127) as necessary. As will be described in other sections, the second handle magnet 129 in combination with the first handle magnet 128 may help facilitate the lengthening and shortening of the leash assembly 100.

Figure 5:
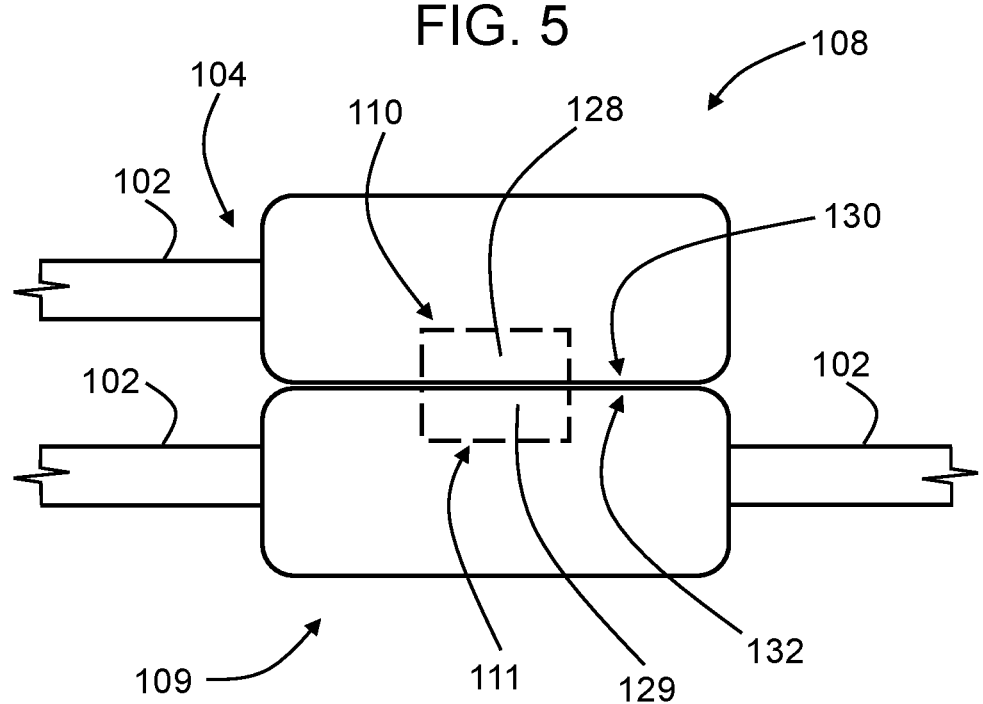
FIGS. 5-7 are pictorial illustrations showing aspects of a combined leash handle according to exemplary embodiments hereof.

As shown in FIG. 5, the first and second handles 108, 109 may be mated by attaching the first and second attachment members 110, 111 together. Where the attachment members 110, 111 include magnets 128, 129 respectively, this may entail abutting the north pole of the first handle magnet 128 with the south pole of the second handle magnet 129 (or vice versa). Accordingly, it is preferable that the outward facing pole of the first handle magnet 128 be the opposite of the outward facing pole of the second handle magnet 129.

Figure 6:
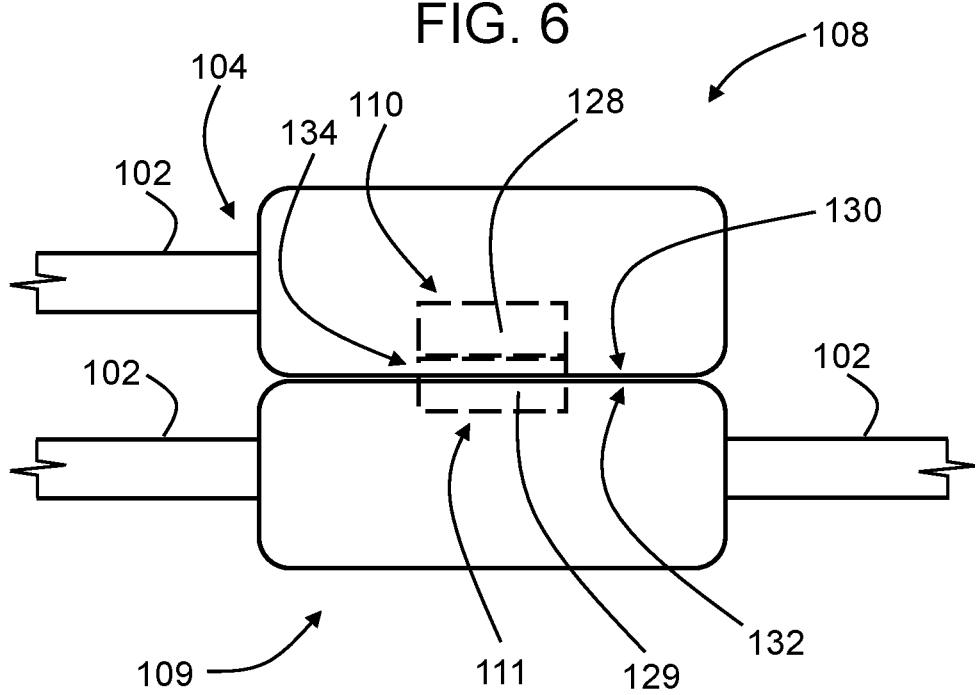

FIG. 6 shows the first handle magnet 128 recessed from the handle's bottom surface 130 and the second handle magnet 129 protruding from the second handle's top surface 132. In this way, the second handle magnet 129 is received into the cavity 134 created by the recessed first handle magnet 129 in the bottom surface 130 and supported laterally therein. The magnets 128, 129 may preferably be similar in size and shape with the cavity 134 as shown in FIG. 6 appropriately sized to receive the protruding second handle magnet 129. This configuration may provide lateral support to the adjoining first and second handles 108, 109. Note also that, in other embodiments, the first handle magnet 128 may protrude from the handle's bottom surface 130 and the second handle magnet 129 may be recessed from the second handle's top surface 132, thereby providing the same outcome but upside-down.

Figure 7:
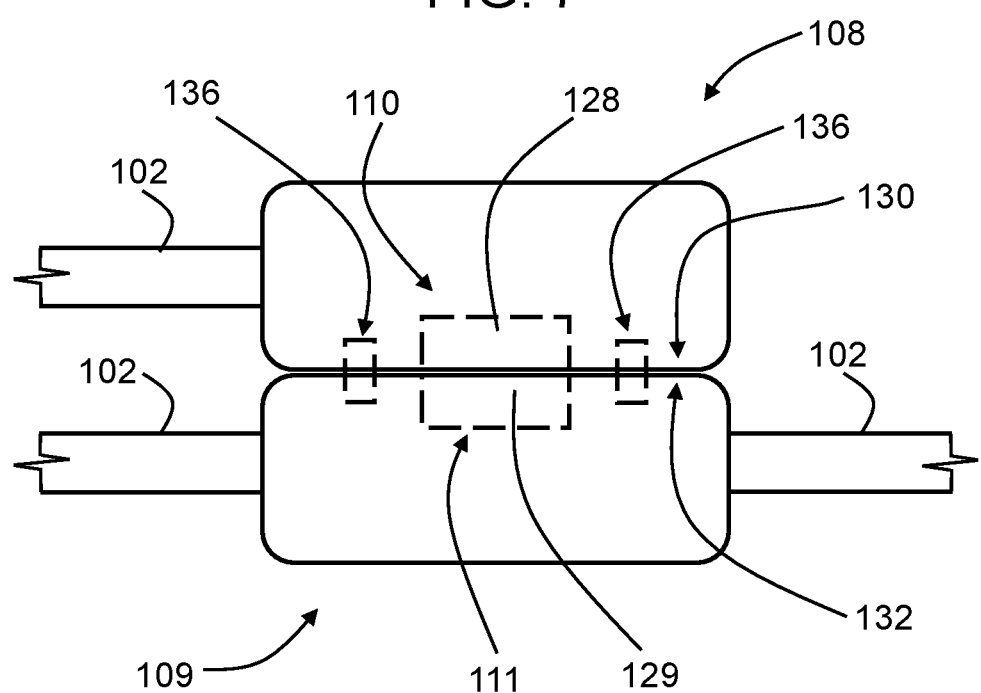

FIG. 7 shows handle alignment structures 136 that may align the first and second handles 108, 109 when mated. The handle alignment structures 136 may include post/hole combinations, aligning contours, ridges and/or grooves, other types of alignment structures and any combination thereof. The alignment structures 136 may be configured with or generally embedded into the bottom surface 130 of the first handle 108 and/or the top surface 132 of the second handle 109 (or with any other portion of the handles 108, 109 as necessary). While FIG. 7 shows two alignment structures 136, it is understood that the first and second handles 108, 109 may include any number of alignment structures 136 (e.g., one, three, four or more) as required.

Figure 8:
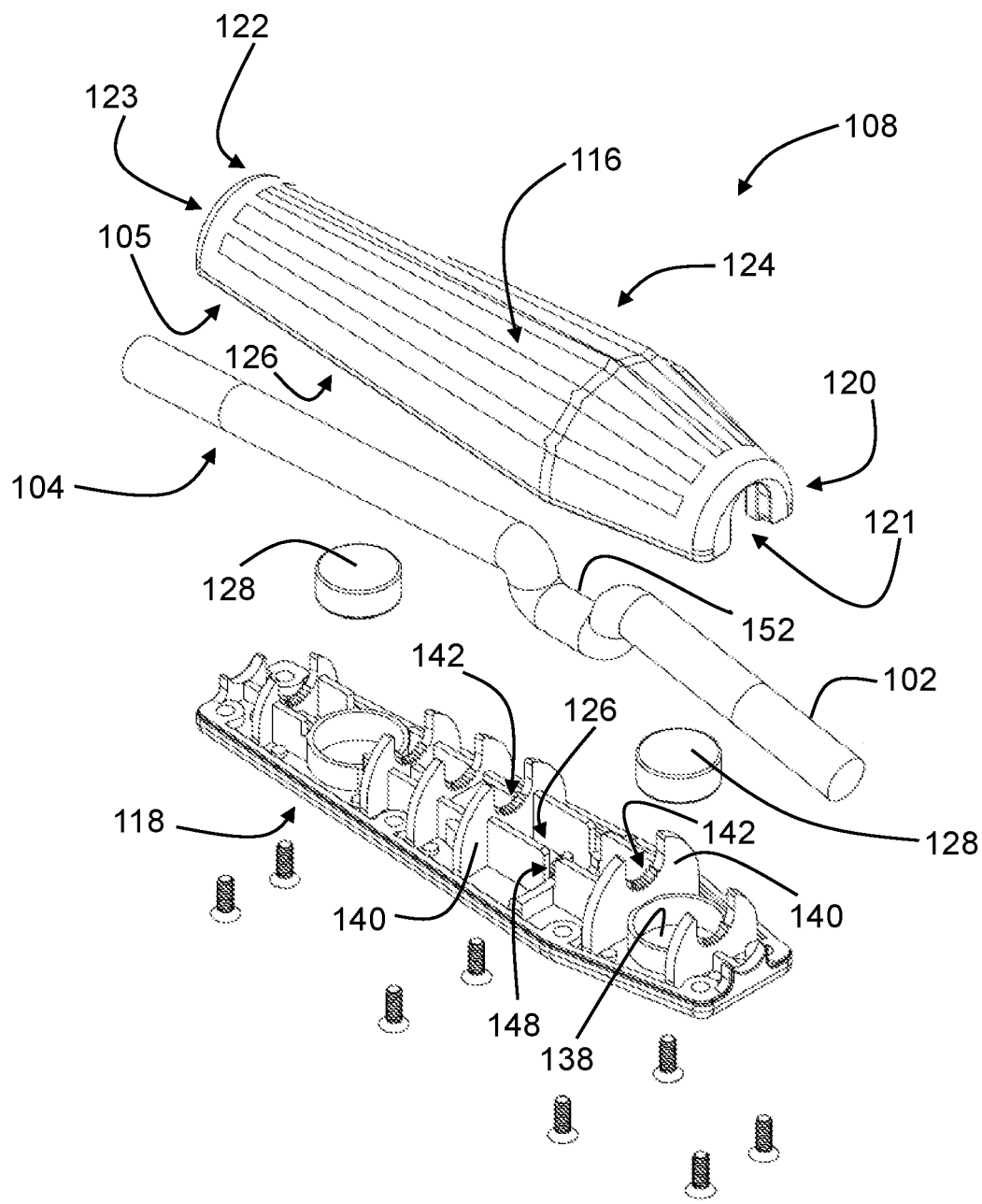
FIG. 8 is a pictorial illustration showing aspects of a first leash handle according to exemplary embodiments hereof.
Figure 9:
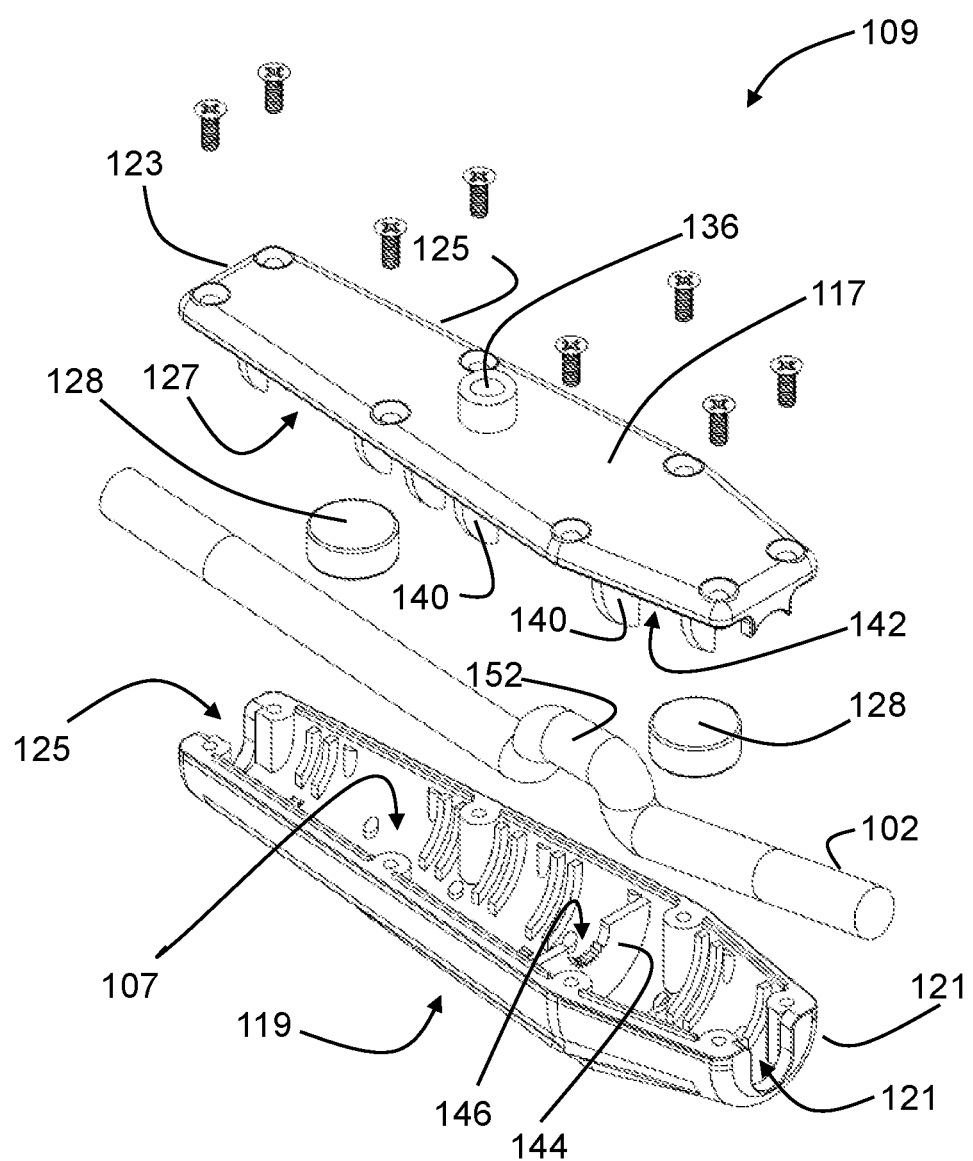
FIGS. 9-11 show aspects of a second leash handle assembly according to exemplary embodiments hereof.

In one exemplary embodiment hereof as shown in FIGS. 8-12, a preferred embodiment includes a first handle 108 (e.g., first handle 108 as shown in FIG. 8) and a second handle 109 (e.g., second handle 109 as shown in FIG. 9). The first handle 108 is formed by combining a first top portion 116 with a first bottom portion 118, thereby creating the first handle 108 with a first inner volume 105. The first handle 108 includes a front opening 121 in communication through the inner volume 105 with a rear opening 123. In some embodiments, the line 102 passes through the front opening 121 (i.e. the front opening of top portion 116), the inner volume 105 and the rear opening 123 (i.e. the rear opening of top portion 116), and is thereby coupled with the first handle 108.

Similar to the first handle 108, the second handle 109 (e.g., as shown in FIG. 9) is formed by combining a second top portion 117 with a second bottom portion 119, thereby creating the second handle 109 with a second inner volume 107. The second handle 109 includes a front opening 121 in communication through the inner volume 107 with a rear opening 125. In some embodiments, the line 102 passes through the front opening 121 (i.e. the front opening of second bottom portion 119), the inner volume 107 and the rear opening 125 (i.e. the rear opening of second bottom portion 119), and is thereby coupled with both the second top portion 117 and the second bottom portion 119 of the second handle 109.

In some embodiments, the first handle's bottom portion 118 (e.g., as shown in FIG. 8) includes one or more upward extending line support members 140 adapted to hold the line 102 in place within the inner volume 107. In some embodiments, the support members 140 include upward extending walls with top notches 142 in which at least a portion of the line 102's circumference may rest. The support members 140 may be aligned along a path from the front opening 121 to the rear opening 123 so that the members 140 support the line 102 within the inner volume 105.

In some embodiments, the first handle's top portion 116, as shown in FIG. 8, includes at least one downward extending support member 144 including a bottom notch 146 in which at least a portion of the line's circumference may engage. In some embodiments, with the top portion 116 combined with the bottom portion 118, the support member 144 in the upper portion 116 may extend downward between two adjacent upward extending support members 140 and press a portion of the line 102 into a lower line cavity 150 formed in the bottom portion 118. This may create a kink 152 in the line 102 in this area. In some embodiments, the downward extending support member 144 may be held within a channel 148 (e.g., between the sides of the line cavity 150 in the lower portion 118) in order to hold the kinked portion 152 of the line 102 secure. In this way, the kink 152 in the line 102 may prevent the line 102 from moving within the inner volume 105 thereby securing the first handle 108 to the line 102. In some embodiments, the notches 142, 146 as shown in FIG. 9 may include teeth, ribs, or other frictional elements that may assist in holding the line 102.

In some embodiments as shown in FIG. 9, the second handle's top portion 117 includes downward extending support members 140 (with notches 142) and its bottom portion 119 includes upward extending support member 144 with notch 146. It is understood that that these elements may perform similar functionalities as their equivalent elements described in relation to the first handle 108 of FIG. 8, and in order to avoid redundancy, these details need not be repeated here. Accordingly, with the top portion 117 mated with the bottom portion 119, a kink 152 is formed in the line 102 thereby securing the line 102 within the inner volume 107 of the second handle 109.

Figure 10:
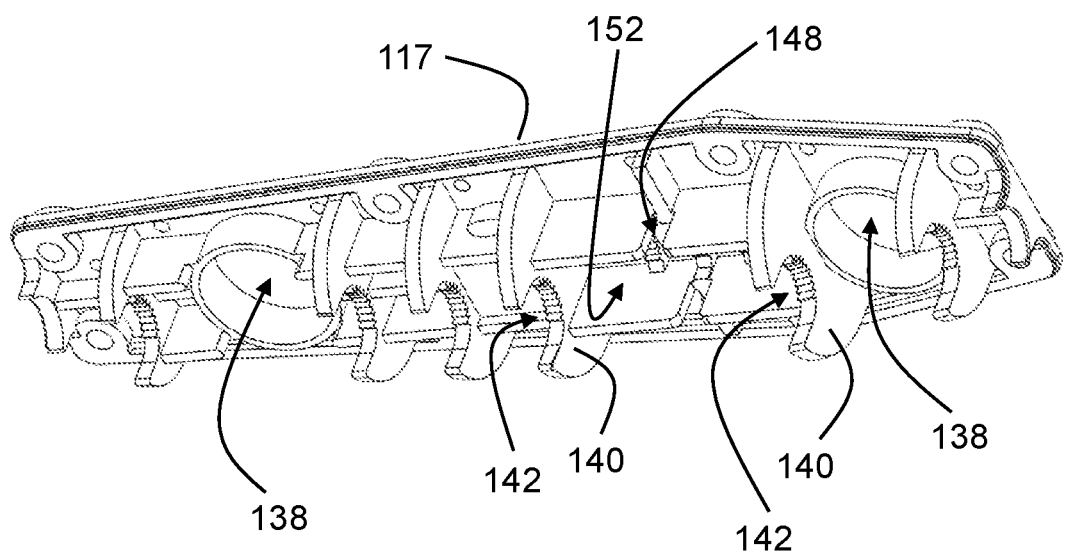
Figure 11:
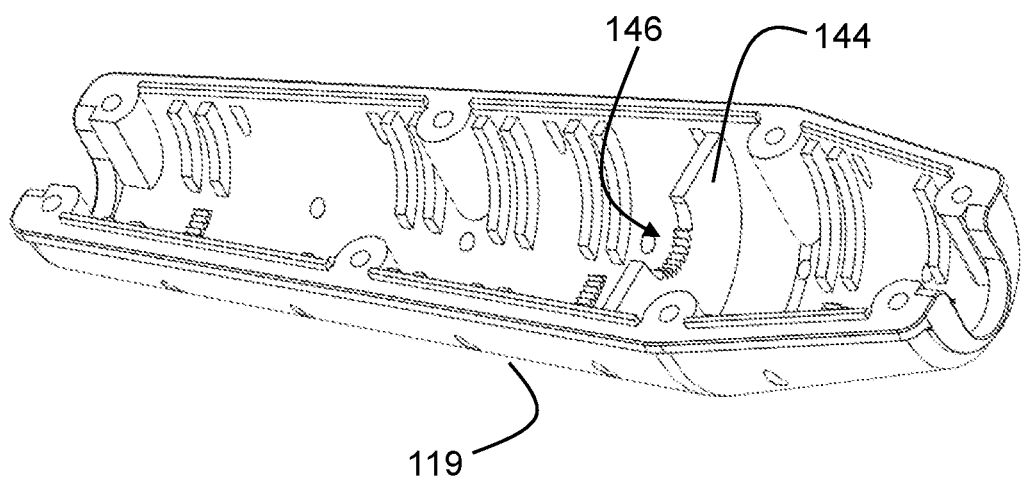

Turning to FIG. 10, FIG. 10 shows a pictorial illustration of first handle 108. In some embodiments, the first handle 108 includes a first attachment member 110 (as shown in FIG. 7) comprising a first magnet 128 embedded or generally configured with the lower front portion of the first handle 108, and a second attachment member 111 (e.g., as shown in FIG. 7) comprising a second magnet 128 embedded or generally configured with the lower rear portion of the handle 108. As shown in FIG. 8, in some embodiments, the first magnet 128 is positioned within a first magnet cavity 138 formed with the bottom 118 of the handle 108, and the second magnet 128 is positioned within a second magnet cavity 138 formed with the bottom 118 of the handle 108. The magnets 128 may be secured within the respective cavities 138 by pressure fit, adhesive, detents, clamps or by other attachment mechanisms. It may be preferable that when received and secured within the magnet cavities 138, the bottom surface of each respective magnet 128 is held close to or flush with the bottom surface of the handle's bottom 118. In this way, the magnets 128 may adequately attract opposing magnets 128 configured with the second handle 109 when the handles 108, 109 are mated.

Figure 14:
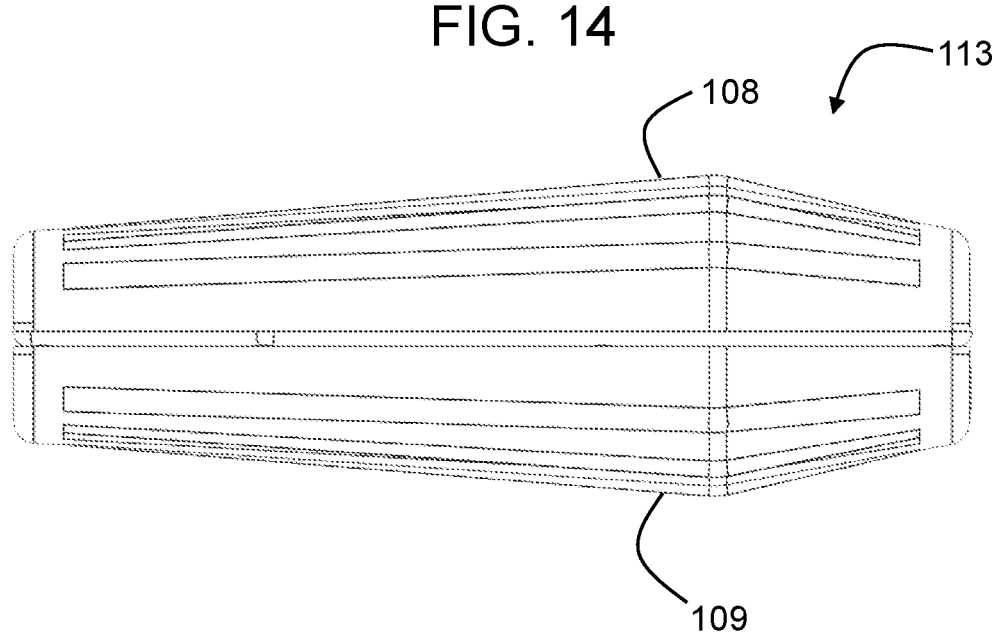
FIG. 14 shows aspects of a combined leash handle assembly according to exemplary embodiments hereof.
Figure 15:
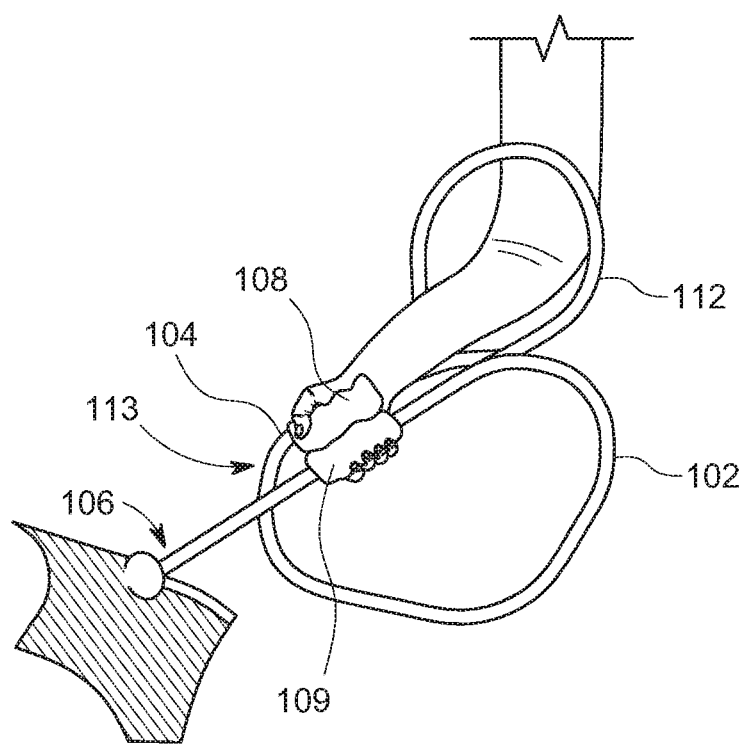
FIG. 15 shows aspects of a leash assembly according to exemplary embodiments hereof.

In some embodiments, the second handle 109 includes a third attachment member 111 comprising a third magnet 128 embedded or generally configured with upper front portion of the second handle 109, and a fourth attachment member 111 comprising a fourth magnet 128 embedded or generally configured with the upper rear portion of the second handle 109. In some embodiments, the third magnet 128 is positioned within a third magnet cavity 138 formed in the top 117 of the second handle 109 (best seen in FIG. 10), and the fourth magnet 128 is positioned within a fourth magnet cavity 138 formed in the top 117 of the second handle 109 best seen in FIG. 10 which shows the underside of the top portion 117 of the second handle 109 according to one or more non-limiting embodiments. The magnets 128 may be secured within the respective cavities 138 by pressure fit, adhesive, clamps or by other attachment mechanisms. It may be preferable that when received and secured within the magnet cavities 138, the upper surface of each respective magnet 128 is held close to or flush with the top surface of the handle's top 117. In this way, the magnets 138 may adequately attract opposing magnets configured with the first handle 108 when the handles 108, 109 are mated. As shown in FIG. 14 and FIG. 15, when the handles 108, 109 are mated, a combined handle 113 may be formed and the length of the leash assembly 100 may be reduced.

Figure 12:
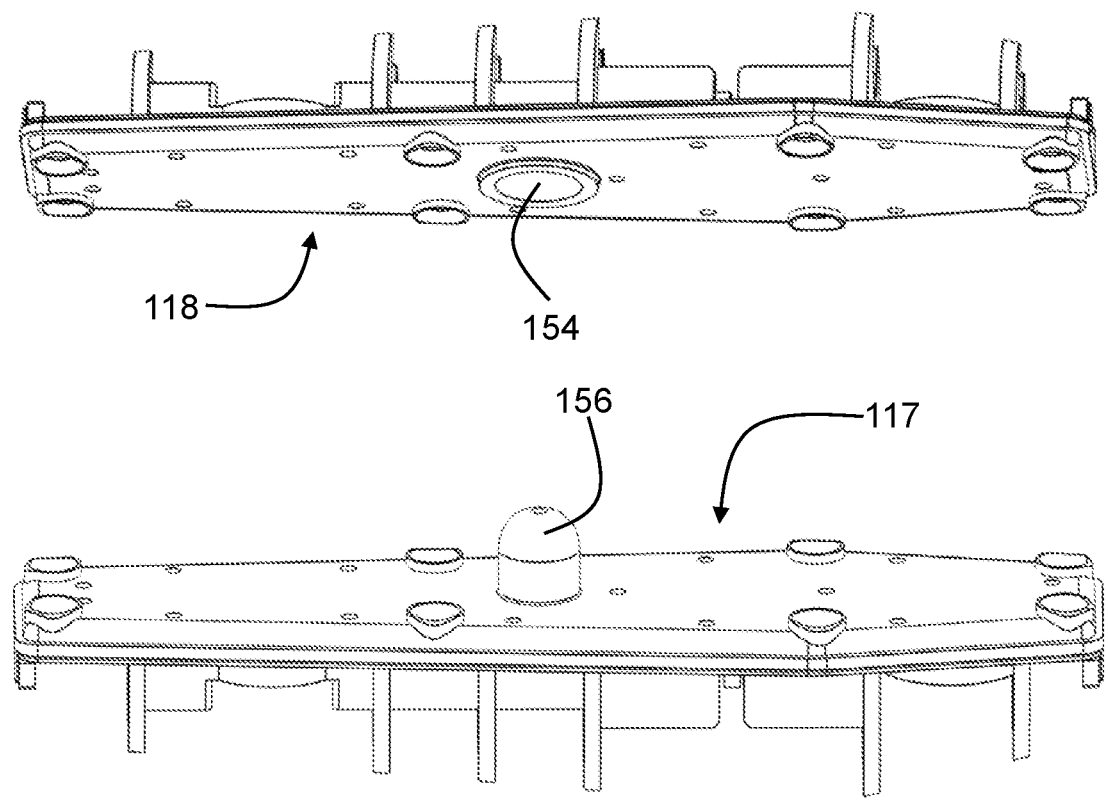
FIGS. 12-13 show aspects of a first and second leash handle assembly according to exemplary embodiments hereof.
Figure 13:
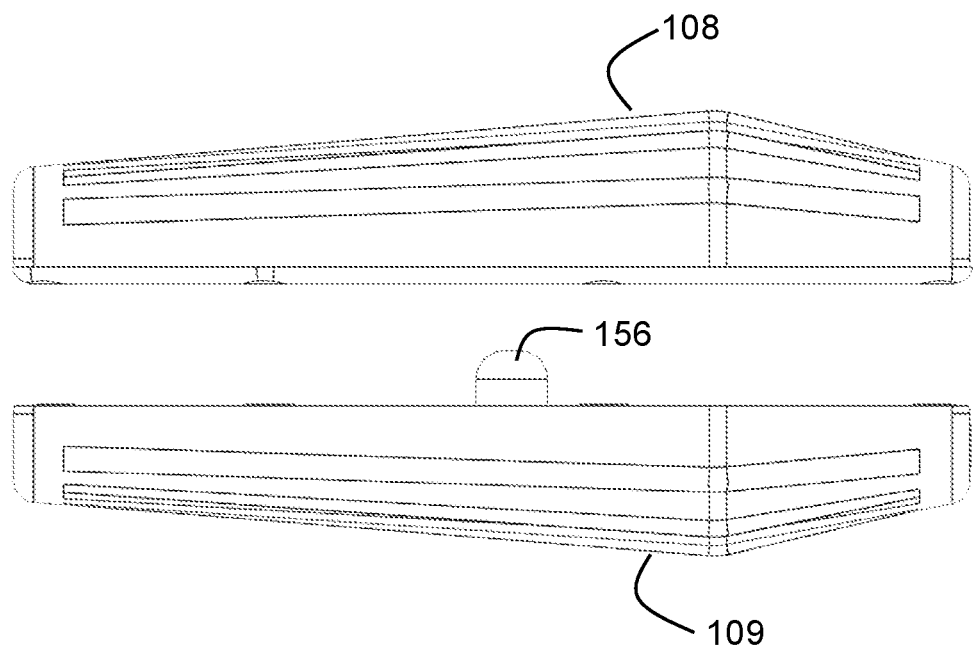

In some embodiments as shown in FIGS. 12 and 13, the bottom portion 118 of the first handle 108 includes an alignment structure 136 (e.g., as shown in FIG. 7). In one or more non-limiting embodiments, as shown in FIG. 12 and FIG. 13, the alignment structure 136 may include an opening 154, and the top portion 117 of the second handle 109 includes an alignment structure 136 comprising a post 156 as shown in FIG. 13. In some embodiments, the opening 154 is adapted to receive the post 156 when the first and second handles 108, 109 are mated, thereby properly aligning the handles 108, 109 together. It is preferable that with the post 156 received into the opening 154 that the first magnet 128 (in the first handle 108) is aligned with the third magnet 128 (in the second handle 109), and the second magnet 128 (in the first handle 108) is aligned with the fourth magnet 128 (in the second handle 109). In this way, the combined post 156 and opening 154 may align the handles 108, 109, and the opposing magnets 128 may engage and secure the handles 108, 109 together. It is understood that the post 156 may be configured with the first handle 108 and the opening 154 may be configured with the second handle 109.

As shown in FIGS. 14 and 15, with the first and second handles 108, 109 mated, a combined handle 113 may be formed. As shown in FIG. 15, the user may grasp the combined handle 113 to hold and control the leash assembly 100. When holding the leash assembly 100 by the combined handle 113, the active portion of the line 102 (the usable portion of the line 102 extending from the user's hand to the harness assembly 200 which is shown in FIG. 1 whereby the harness assembly 200 is configured to be attached to the pet) is reduced from the full length L1 of the line 102 to the reduced length L2 as illustrated in FIG. 2. The length of line 102 extending from the back portion 123 (e.g., back portion 123 shown in FIG. 4) of the second handle 109 to the front portion 120 of the first handle 108 (e.g., front portion 120 shown in FIG. 3) may form a loop that may preferably not obstruct the use of the leash assembly 100 which is illustrated in FIG. 15.

In addition, with the first and second handles 109, 109 mated, the overall footprint (or form factor) of the leash assembly 100 is generally reduced to the loop of line 102 formed between the handles 108, 109. This allows for easy storage of the leash assembly 100 (e.g., by hanging the loop on a wall hook, etc.).

To subsequently lengthen the leash assembly 100, the first and second handles 108, 109 may be de-mated (e.g., by pulling apart first and second handles 108, 109 respectively so that the magnets 128 included in each handle 108, 109 are pulled apart from one another). Accordingly, once the combined handle 113 is pulled apart, the user may again grip the leash 100 by the first handle 108.

In some embodiments, the length L2 is about one-quarter the length L1, whereby L1 and L2 are shown in FIG. 1. In other embodiments, the length L2 is one-fifth, one-third, one-half, three-fifths, three-quarters, five-eighths or other fractional lengths of L1. It is understood that the length L2 may be any fractional length of the length L1, and that the scope of the assembly 10 is not limited in any way by the length L2 relative to the length L1.

Also, while the above example describes the bottom portion 118 of the first handle 108 mated with the top portion 117 of the second handle 109 to form the combined handle 113, it is understood that any portion of the first handle 108 may be configured with any portion of the second handle 109 to provide a similar result. It is also understood that the attachment members 110, 111 (e.g., the magnets 128) may be configured with any portion of the handles 108, 109 respectively as necessary for this outcome.

In addition, it also is understood that the leash assembly 100 may include additional handles that may include attachment members 110 (e.g., additional magnets 128), and that the handles may be adapted to attach to the first handle 108, the second handle 109, the combined handle 113, any other handle and any combination thereof to alter or otherwise adjust the active (usable) length of the leash assembly 100 and/or to prepare the leash assembly 100 for storage.

In other embodiments, the attachment members 110, 111 may include other types of attachment mechanisms such as snaps, hook and loop material, clips, other attachment mechanisms and any combination thereof. In addition, the handles 108, 109 may include any number of attachment members 110, 111 (e.g., two, three, etc.) as necessary.

The Attachment Mechanism

Figure 16:
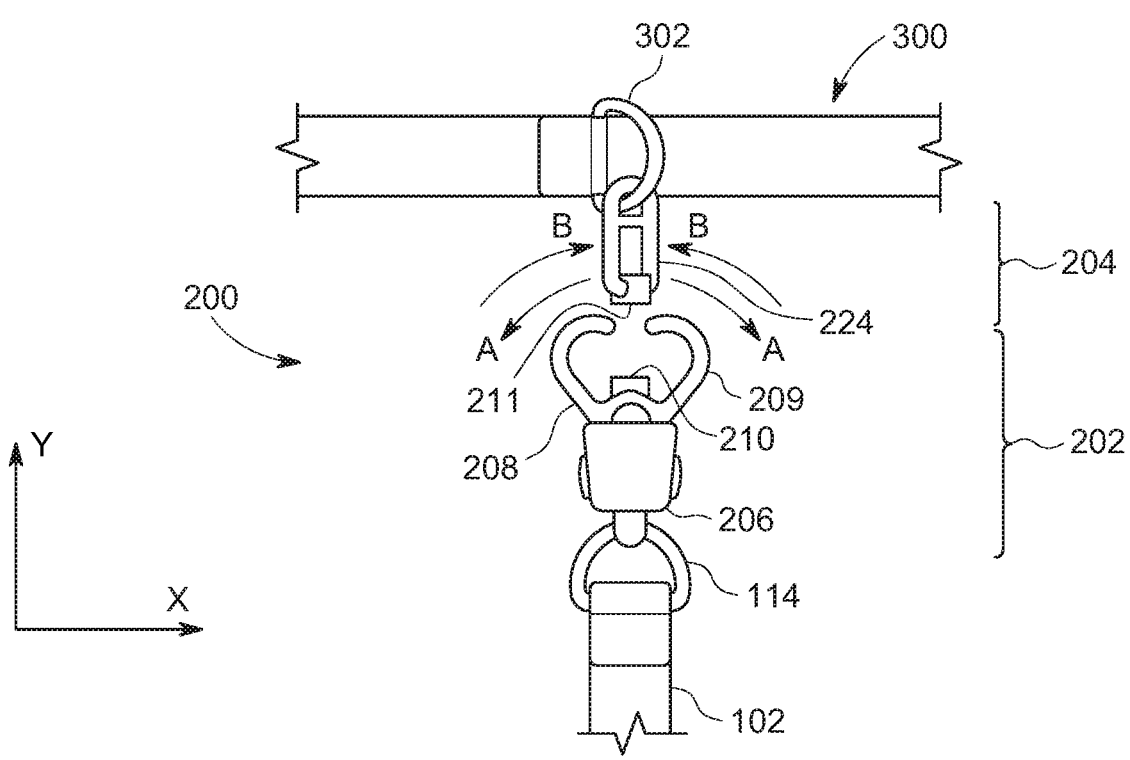
FIG. 16 shows aspects of a leash and harness attachment mechanism according to exemplary embodiments hereof.

In one exemplary embodiment as shown in FIG. 16, the assembly 10 may include an attachment mechanism 200 that may generally attach the leash assembly 100 to the harness assembly 300 as shown in FIG. 1. The attachment mechanism 200 may include a first attachment portion 202 and a second attachment portion 204, wherein the first and second attachment portions 202, 204 are adapted to engage with one another (e.g., to attach the leash 100 to the harness assembly 300) and to subsequently disengage from one another (e.g., to detach the leash 100 from the harness assembly 300). It is noted that "harness assembly" may include rolled or flat collars (e.g., standard dog collars), martingales, choke chains, pinch collars, front attaching harnesses, body harnesses, other types of harnesses and any combination thereof.

Figure 17:
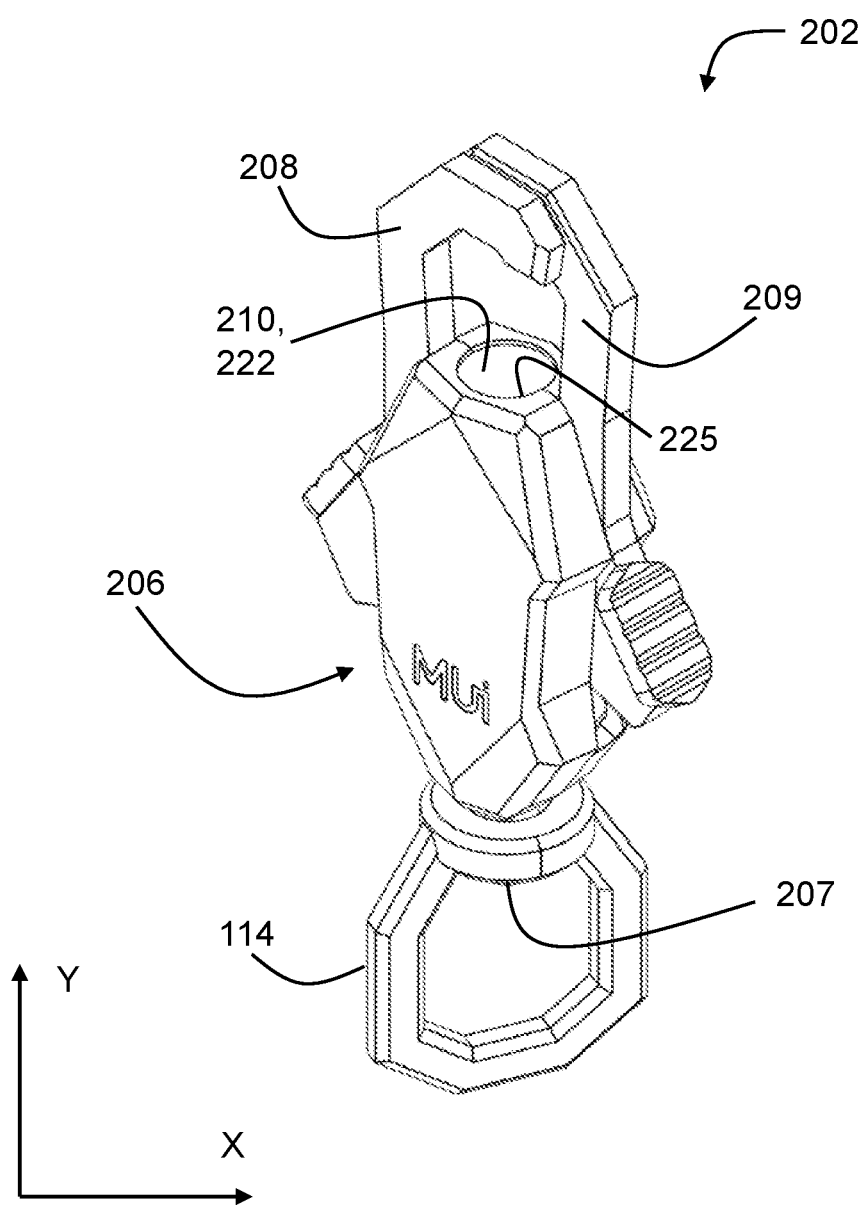
FIGS. 17-18 show aspects of a first portion of an attachment mechanism according to exemplary embodiments hereof.

In one exemplary embodiment hereof as shown in FIG. 17, the first attachment portion 202 may include a base 206 configured with first and second hook members 208, 209, and a first attachment guide member 210. The lower portion of the base 206 is adapted to connect to the leash assembly's second end mount 114 (e.g., 114 as shown in FIG. 16 above) to attach the attachment mechanism 200 to the leash assembly 100. At this junction, the base 206 may include a swivel joint 207 that may rotate freely about the longitudinal axis (Y-axis) of the attachment mechanism 200 (preferably with 360° of rotational freedom).

Figure 18:
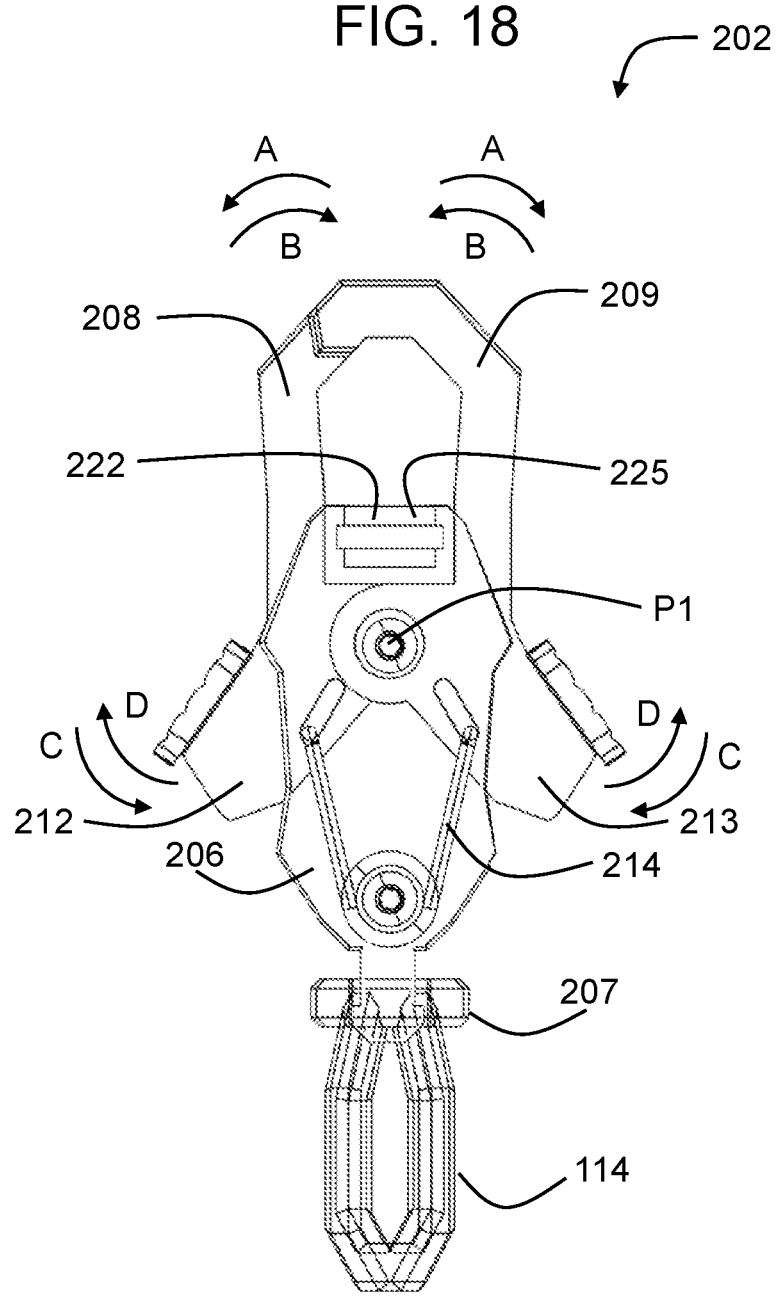
Figure 19:
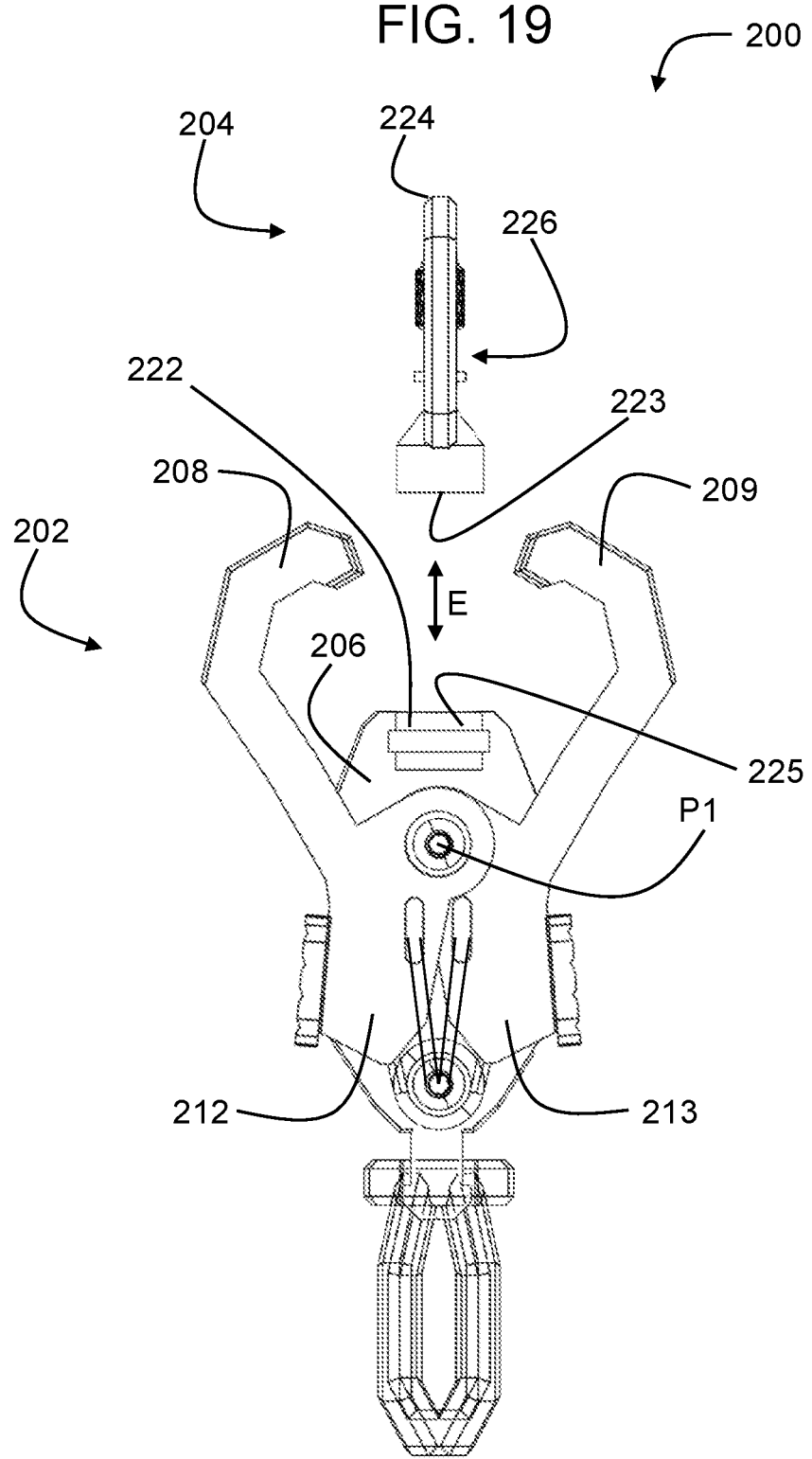
FIG. 19 shows aspects of first and second portions of an attachment mechanism according to exemplary embodiments hereof.
Figure 20:
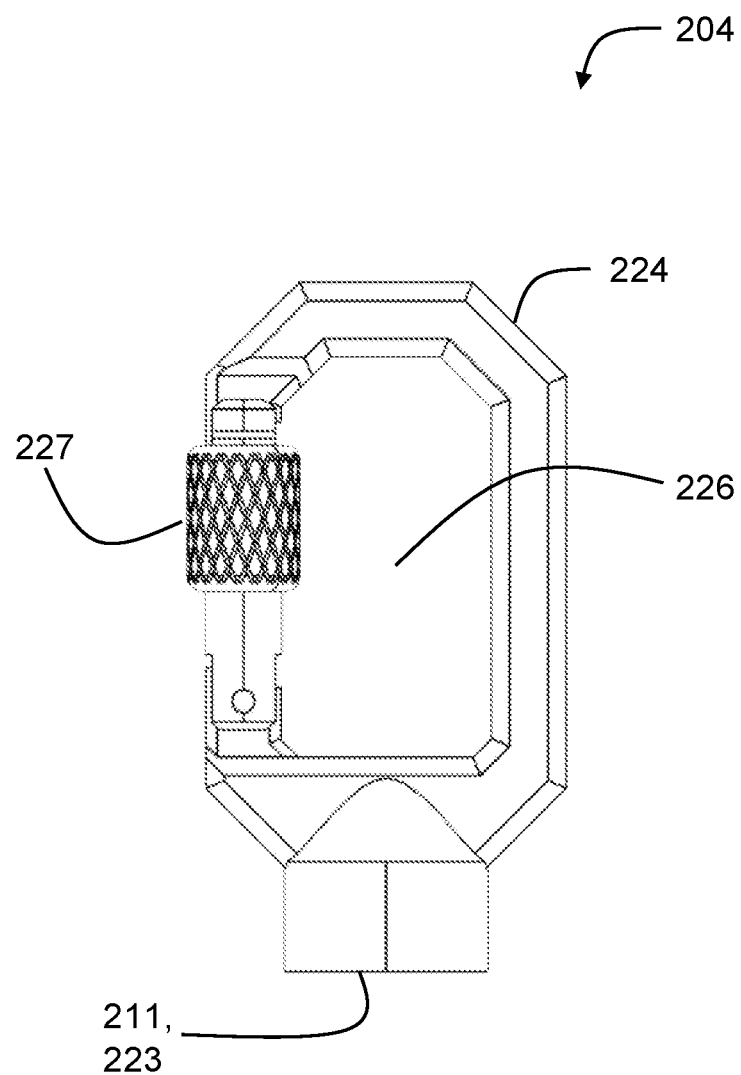
FIG. 20 shows aspects of a second portion of an attachment mechanism according to exemplary embodiments hereof.

As shown in FIGS. 18-19, the base 206 is coupled with the first and second hook members 208, 209 at a pivot point P1. The pivot point P1 may include a pivot mechanism such as a pin, a bolt, a dowel, any other type of pivot mechanism and any combination thereof. The first and second hook members 208, 209 are adapted to rotate open (e.g., in the direction of arrows A) and to rotate closed (e.g., in the direction of arrows B) about the pivot point P1.

In some embodiments, the hook members 208, 209 are positioned face-to-face and may overlap when closed (thus closing the first portion 202 as shown in FIGS. 16-18 of the attachment mechanism 200). The first and second hook members 208, 209 rotate about pivot point P1 with each hook member 208, 209 including a lower leg 212, 213 respectively extending below the pivot point P1. In this way, the hook members 208, 209 rotate outward (arrows A) when the lower legs 212, 213 are rotated inward (arrows C), and inward (arrows B) when the lower legs 212, 213 are rotated outward (arrows D) as shown in FIG. 18. Accordingly, these motions may be used to open (e.g., as shown in FIG. 19) and close (e.g., as shown in FIG. 18) the hook members 208, 209 respectively. The pivot point P1 is a point where the first and second hook members 208, 209 may connect and may be configured to rotate open and close with respect to each other. Further, a portion of the first hook member 208 and a portion of the second hook member 209 may overlap each other when rotated inwards around the pivot point P1.

A biasing member 214 (e.g., a spring) is attached between the lower legs 212, 213 to apply an outward bias to the legs 212, 213 adapted to help retain the lower legs 212, 213 in an outward position (so that the hook members 208, 209 are biased in an inward or closed position). The biasing member 214 may also be configured between the hook members 208, 209 to achieve a similar result.

The lower legs 212, 213 may include buttons or other types of gripping members on their outer areas that may facilitate the moving of the legs 212, 213 in and out by the user to open and close the hooks 208, 209 (e.g., by gripping the buttons between the thumb and forefinger and squeezing and/or releasing the buttons). In addition, a portion of the base 206, the hooks 208, 209, the pivot point P1, the legs 212, 213, and the buttons may be held within a housing.

In one exemplary embodiment hereof, the first attachment guide member 210 is attached to the top of the base 206 (or to another similarly located structure of the first portion 202) above the pivot point P1. In this way, when the hook members 208, 209 are opened, the first attachment guide member 210 may be exposed from the top. In one exemplary embodiment hereof, the first attachment guide member 210 may include a first guide magnet 222 as shown in FIG. 17.

Figure 21:
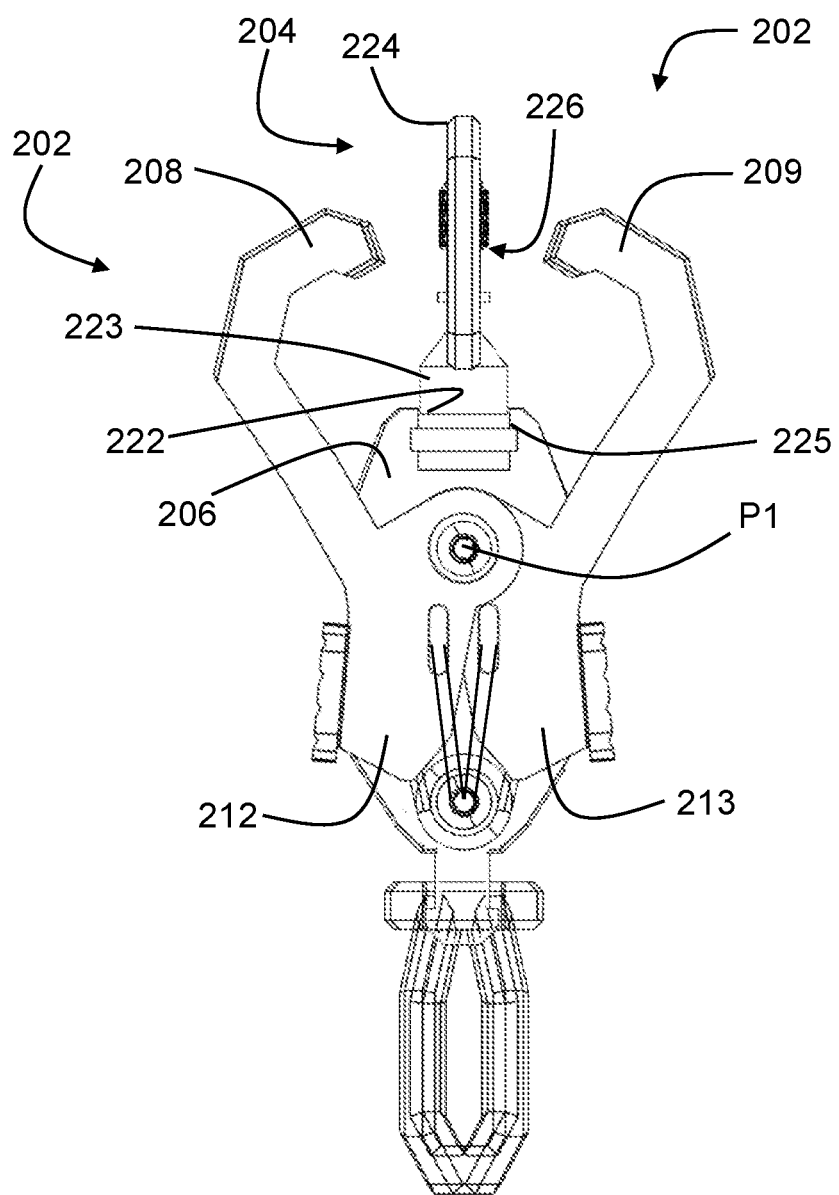
FIGS. 21-22 show aspects of first and second portions of an attachment mechanism according to exemplary embodiments hereof.
Figure 22:
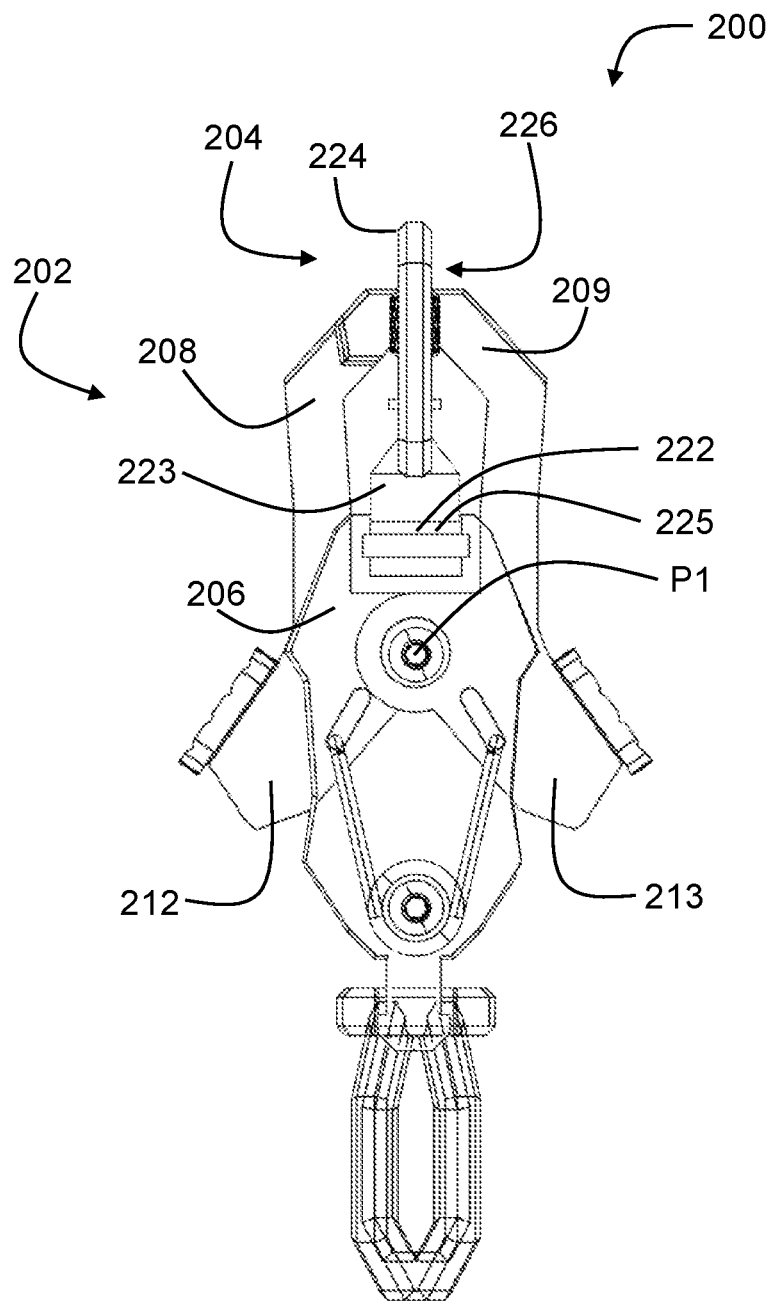

In one exemplary embodiment hereof the second attachment portion 204 of the attachment mechanism 200 used to attach the leash 100 to the harness assembly 300 may include a retainer ring 224 (which may also be described as a connection point to the harness assembly 300) and a second attachment guide member 211 attached to its lower portion as shown in FIGS. 19-22. As shown in FIG. 19, the retainer ring 224 is connectable to the harness assembly 300 (e.g., by removably attaching it to the harness's attachment ring 302 as typically found on standard harnesses 300) and adapted to extend outwardly from the harness 300 (best seen in FIG. 16). The retainer ring 224 may include a gate mechanism 227 (e.g., see FIG. 20) that may be opened and subsequently closed to facilitate its attachment to the harness's attachment ring 302. The retainer ring 224 includes an opening 226 (also referred to herein as an aperture) adapted to receive the hook members 208, 209 when in their closed configuration or when hook members 208, 209 overlap one another so as to be securely attached to the retainer ring 224 of the harness assembly 300. In this way, the hook members 208, 209 may close around the retainer ring 224 thereby hooking the first and second portions 202, 204 together (FIG. 22).

In one exemplary embodiment hereof, the second attachment guide member 211 may include a second guide magnet 223 as shown in FIGS. 20-23. As shown in FIGS. 19 and 21, the corresponding magnetic forces associated with the first and second guide magnets 222, 223 (represented by arrow E of FIG. 19) may attract the magnets 222, 223 together when the magnets 222, 223 are brought within close proximity. In this way the magnets 222, 223 may mate. To achieve this, the upper facing pole of the first guide magnet 222 may preferably be opposite the lower facing pole of the second guide magnet 223 such that poles attract one another.

In some embodiments, the first magnet 222 is located within a recess 225 formed in the top of the base 206. The recess 225 is preferably adapted to generally match the cross-sectional shape and diameter of the second magnet 223 so that when the second magnet 223 is mated with the first magnet 222, a portion of the second magnet 223 (e.g., the lower portion) may be received into the recess 225. In this way, the recess 225 may provide lateral stability to the second magnet 223 when the magnets 222, 223 are mated.

The magnetic attraction provided by the two guide magnets 222, 223 serves several functionalities. First, as the user acts to connect the first portion 202 of the attachment mechanism 200 to the second portion 204, the guide magnets 222, 223 may attract one another thereby guiding the portions 202, 204 into the correct placement and orientation for the hook members 208, 209 which are part of the first portion 202 to engage the retaining ring 224, which is part of the second portion 204. In this way, the attachment mechanism 200 is a self-guiding attachment mechanism. Second, once mated, the guide magnets 222, 223 serve to provide additional attachment force and security to the attached portions 202, 204.

Once the guide magnets 222, 223 are mated, the hook members 208, 209 may be released to close through the opening 226 in the retainer ring 224 thereby hooking the first and second portions 202, 204 together.

In some embodiments, the guide magnets 222, 223 may include grade N35 0.5 inch by 0.25 inch Neodymium rare earth disc magnets with 9.3 pounds of pulling force, but it is understood that other types of magnets with other pulling forces may also be used.

Figure 23:
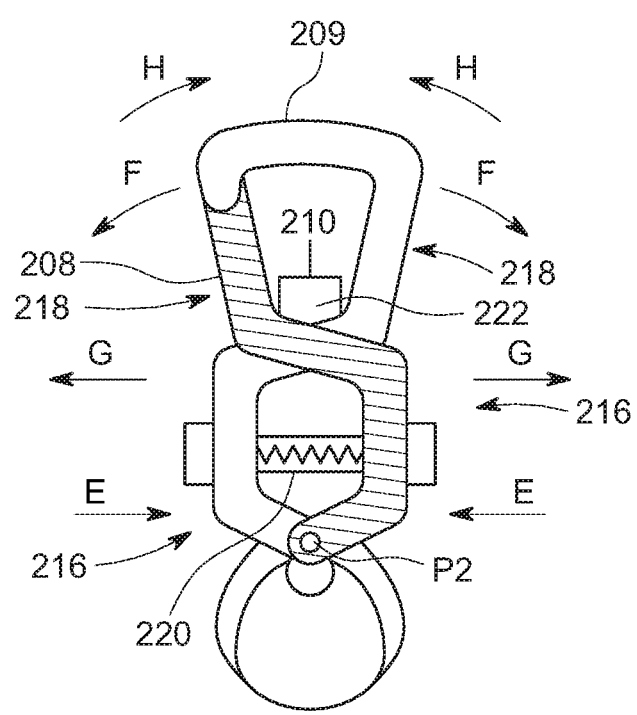
FIG. 23 shows aspects of a first portion of an attachment mechanism according to exemplary embodiments hereof.

In another example embodiment as shown in FIG. 23, the first and second hook members 208, 209 are "S" shaped and configured to rotate about a lower pivot point P2. The hooks 208, 209 are mirrored and overlapping. Due to the "S" shape of the hooks 208, 209, the hooks 208, 209 each include a lower portion 216 and an upper portion 218. With the pivot point P2 located at the bottom of the lower portions 216, the lower portions 216 may be rotated inward (arrows E) to rotate the upper portions 218 outward (arrows F), and rotated outward (arrows G), to rotate the upper portions 218 inward (arrows H). Accordingly, these motions open and close the hook members 208, 209 respectively.

A biasing member 220 (e.g., a spring) as shown in FIG. 23 may be attached between the lower portions 216 to apply an outward bias to the lower portions 216 adapted to help retain the lower portions 216 in an outward position (so that the hook members 208, 209 are biased in an inward or closed position). The biasing member 214 also may be configured between the upper portions 218 to achieve a similar result.

The lower portions 216 may include buttons or other types of gripping members on their outer areas that may facilitate the moving of the lower portions 216 in and out by the user to open and close the hooks 208, 209 (e.g., by gripping the buttons between the thumb and forefinger and squeezing and/or releasing the buttons). In addition, a portion of the hooks 208, 209, the pivot point P2, and the buttons may be held within a housing.

It is understood by a person of ordinary skill in the art that the above example attachment mechanism architectures are meant for demonstrational purposes and that the first portion 202 of the attachment mechanism 200 may include other architectures that may provide the same or similar functionalities (that is, the ability to open and close the hook members 208, 209 by squeezing and/or releasing the first portion 202). It is also understood that the scope of the assembly 10 is not limited in any way by the architecture of the hook members 208, 208 or the overall first portion 202 of the attachment mechanism 200. For example, the first portion 202 may include a single button that may be adapted to open and close the hook members 208, 209.

The Harness Assembly

In one exemplary embodiment hereof, the assembly may include a harness assembly 300 as shown in FIG. 1 and also in FIG. 16. The harness assembly 300 may include rolled or flat collars (e.g., standard dog collars), martingales, choke chains, pinch collars, front attaching harnesses, body harnesses, other types of harnesses and any combination thereof.

The harness assembly 300 may include one or more attachment rings 302 (e.g., as shown in FIG. 16 and typically included with a standard harness 300) upon which the retaining ring 224 may attach. In this way, when the first portion 202 of the attachment mechanism 200 is attached to the retaining ring 224, the leash assembly 100 is effectively attached to the harness assembly 300.

In Use

Referring to FIGS. 18-19 and 21-22, to attach the leash assembly 100 to the harness assembly 300, the user may use the attachment mechanism 200 to connect the attachment mechanism 200 to the harness assembly 300. In use, in one embodiment, the user may place the harness assembly 300 on the pet or other animal prior to trying to attach the leash assembly 100 to the harness assembly 300. However, it is also possible for the user to attach the leash assembly 100 to the harness assembly 300 (via the attachment mechanism 200) and then secure the harness assembly 300 on the pet or other animal.

In one or more non-limiting embodiments, the method of using assembly 10 may begin by grasping the first portion 202 of the attachment mechanism 200 (with a single hand, for example, between the thumb and forefinger), and squeezing the legs 212 (also referred to herein as extensions), 213 together to open the hook members 208, 209 (e.g., as shown in FIG. 18). The user may then place the first portion 202 of the attachment mechanism 300 in close proximity to the attachment mechanism's second portion 204 such that the guiding magnets 222, 223 may attract one another (and preferably mate) to guide the first portion 202 into place with respect to second portion 204 for attachment. This may preferably place the retaining ring 224 of the second portion 204 of the attachment mechanism 200 between the open hook members 208, 209 in the proper position and orientation such that when the user releases the hook members 208, 209 (e.g., by relaxing his/her grip) the hook members 208, 209 may engage through the retaining ring 224 thereby attaching the first portion 202 and the second portion 204 of the attachment mechanism 200 together.

To detach the leash assembly 100 from the harness assembly 300, the user may grasp the first portion 202 of the attachment mechanism 200 (with a single hand, for example, between the thumb and forefinger), and squeeze the legs 212, 213 together to open the hook members 208, 209. If the guiding magnets 222, 223 are mated at this juncture, the user may apply adequate outward force (e.g., by pulling on the first portion 202) to overcome the pull force of the magnets 222, 223 and to release the magnets 222, 223 from one another.

To shorten the length of the leash assembly 100, the user may attach the first handle 108 to the second handle 109 (as described in other sections and as shown in FIGS. 14-15) and grasp the combined handle 113. To subsequently extend the length of the leash assembly 100, the attached first and second handles 108, 109 may be detached.

It is understood by a person of ordinary skill in the art, upon reading this specification, that any of the aspects and/or elements described in any of the embodiments herein may be combined in any way to form new embodiments that also are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A leash and harness attachment assembly, the leash and harness attachment assembly comprising:
    an attachment mechanism, wherein the attachment mechanism includes a first portion and a second portion, the first portion adapted to be coupled to a leash and the second portion adapted to be coupled to a harness;
    a first hook member coupled to the first portion of the attachment mechanism, wherein the first hook member comprises a first hook proximal end configured with a pivot point and a first hook distal end extending therefrom, and a second hook member coupled to the first portion and including a second hook proximal end coupled to the pivot point and a second hook distal end extending therefrom, the first and second hook members adapted to open and close;
    a first magnet coupled to the first portion of the attachment mechanism and adjacent the pivot point;
    an exposed recess fixedly adjacent to the first magnet, the exposed recess including a fixed volume;
    a first ring that is part of the second portion of the attachment mechanism, wherein the first ring defines a first aperture; and
    a second magnet coupled to the second portion of the attachment mechanism, wherein the second magnet is adjacent the first aperture of the first ring;
    wherein the first hook distal end and the second hook distal end are configured to overlap and positioned through the first aperture of the first ring when in use; and
    wherein the exposed recess is adapted to receive at least a portion of the second magnet when the first hook distal end and the second hook distal end do not overlap.

2. The leash and harness attachment assembly of claim 1, wherein the first magnet defines at least a portion of the exposed recess.

3. The leash and harness attachment assembly of claim 1, further comprising, a first extension member configured with the first hook member and including a first extension member proximal end configured with the pivot point and a first extension member distal end extending therefrom, and a second extension member configured with the second hook member and including a second extension member proximal end configured with the pivot point and a second extension member distal end extending therefrom, the first and second extension members adapted to rotate inwards and outwards.

4. The leash and harness attachment assembly of claim 3, wherein the rotation of the first and second extension members inwardly causes the first and second hook members to overlap.

5. The leash and harness attachment assembly of claim 1 further comprising a first handle adapted to be coupled to a leash at a first location and a second handle adapted to be coupled to the leash at a second location distinct from the first location.

6. The leash and harness attachment assembly of claim 5 wherein the first handle includes a first handle attachment mechanism and the second handle includes a second handle attachment mechanism, wherein the first and the second handle attachment mechanisms are adapted to attach to one another in order to form a combined handle arrangement that causes a length of the leash to shorten.

7. The leash and harness attachment assembly of claim 6 wherein the first and the second handle attachment mechanisms include first and second handle magnets.

8. The leash and harness attachment assembly of claim 5 wherein the leash includes a leash proximal end and a leash distal end, wherein the first location of the first handle is positioned near the leash proximal end and the second location of the second handle is positioned near the leash distal end.

9. The leash and harness attachment assembly of claim 5, wherein the first handle includes a first guide mechanism and the second handle includes a second guide mechanism, the first and the second guide mechanisms adapted to engage one another.

10. A leash and harness assembly, the leash and harness assembly comprising:
    a leash;
    a harness;
    an attachment mechanism, wherein the attachment mechanism is configured to attach the leash to the harness, wherein the attachment mechanism further comprises:
    a first hook member that is configured to couple to the leash, wherein the first hook member includes a first hook proximal end configured with a pivot point and a first hook distal end extending therefrom, and a second hook member that is configured to couple to the leash and including a second hook proximal end configured with the pivot point and a second hook distal end extending therefrom, wherein the first hook member and the second hook member are adapted to open and close, wherein when closed, the first hook member and the second hook member are configured to overlap each other;

a first magnet located on the attachment mechanism and adjacent the pivot point;

an exposed recess fixedly adjacent to the first magnet, the exposed recess including a fixed volume;

a first ring that is part of the attachment mechanism that is configured to be coupled to the harness, wherein the first ring includes a first aperture; and a second magnet that is configured to be coupled to the first ring, wherein the second magnet is located adjacent the first aperture of the first ring;

wherein the exposed recess is adapted to receive at least a portion of the second magnet;

wherein a first position places the first hook distal end and the second hook distal end in an overlapping engagement, and a second position places the first hook distal end and the second hook distal end in a non-overlapping configuration;

wherein the second position provides a path for at least a portion of the second magnet to be received into the exposed recess, and wherein the first position causes at least a portion of the first hook distal end and at least a portion of the second hook distal end to each pass through the first aperture.

11. The leash and harness assembly of claim 10, wherein the first magnet defines at least a portion of the exposed recess.

12. The leash and harness assembly of claim 10, further comprising a first extension member configured with the first hook member and including a first extension member proximal end configured with the pivot point and a first extension member distal end extending therefrom, and a second extension member configured with the second hook member and including a second extension member proximal end configured with the pivot point and a second extension member distal end extending therefrom, the first and second extension members adapted to transition from a third position to a fourth position.

13. The leash and harness assembly of claim 12, wherein the transition of the first and the second extension members from the third position to the fourth position causes the first and the second hook members to transition from the first position to the second position.

14. The leash and harness assembly of claim 10 wherein the leash includes a leash proximal end and a leash distal end, the leash and harness assembly further comprising a first handle configured with the leash towards the leash proximal end and a second handle configured with the leash towards the leash distal end.

15. The leash and harness assembly of claim 14, wherein the first handle includes a first handle magnet and the second handle includes a second handle magnet, wherein the first and the second handle magnets are adapted to engage one another in order to form a combined handle, wherein a length of the leash is shortened upon forming the combined handle.

16. The leash and harness assembly of claim 14, wherein the first handle includes a first guide mechanism and the second handle includes a second guide mechanism, the first and second guide mechanisms adapted to engage one another.

17. A leash and harness assembly, the leash and harness assembly comprising:
a leash;
a harness;
an attachment mechanism configured to attach the leash to the harness, wherein the attachment mechanism further comprises:
a first hook member that is configured to couple to the leash, wherein the first hook member includes a first hook proximal end configured with a pivot point and a first hook distal end extending therefrom, and a second hook member that is configured to couple to the leash and including a second hook proximal end configured with the pivot point and a second hook distal end extending therefrom, wherein the first hook member and the second hook member are adapted to open and close, wherein when closed, the first hook member and the second hook member are configured to overlap each other;
a first magnet located on the attachment mechanism and adjacent the pivot point;
a first ring that is part of the attachment mechanism that is configured to be coupled to the harness, wherein the first ring includes a first aperture; and
a second magnet that is configured to be coupled to the first ring, wherein the second magnet is located adjacent the first aperture of the first ring;
wherein a first position places the first hook distal end and the second hook distal end in an overlapping engagement, and a second position places the first hook distal end and the second hook distal end in a non-overlapping configuration;
wherein the second position provides a path for the second magnet to engage with the first magnet, and
wherein the second position provides a path for at least a portion of the second magnet to be received into the exposed recess,
wherein the first position causes at least a portion of the first hook distal end and at least a portion of the second hook distal end to each pass through the first aperture;
wherein the leash includes a leash proximal end and a leash distal end, the leash and harness assembly further comprising a first handle configured with the leash towards the leash proximal end and a second handle configured with the leash towards the leash distal end; and
wherein the first handle includes a first handle magnet and the second handle includes a second handle magnet, wherein the first and the second handle magnets are adapted to engage one another in order to form a combined handle, wherein a length of the leash is shortened upon forming the combined handle.

18. The leash and harness assembly of claim 17, wherein the first handle includes a first guide mechanism and the second handle includes a second guide mechanism, the first and second guide mechanisms adapted to engage one another.

* * * * *